US012175245B2

(12) United States Patent
Liljedahl

(10) Patent No.: US 12,175,245 B2
(45) Date of Patent: Dec. 24, 2024

(54) LOAD-WITH-SUBSTITUTION INSTRUCTION

(71) Applicant: Arm Limited, Cambridge (GB)

(72) Inventor: Eric Ola Harald Liljedahl, Stockholm (SE)

(73) Assignee: Arm Limited, Cambridge (GB)

( * ) Notice: Subject to any disclaimer, the term of this patent is extended or adjusted under 35 U.S.C. 154(b) by 9 days.

(21) Appl. No.: 18/108,843

(22) Filed: Feb. 13, 2023

(65) Prior Publication Data

US 2024/0272908 A1 Aug. 15, 2024

(51) Int. Cl.
*G06F 9/30* (2018.01)
(52) U.S. Cl.
CPC ........ *G06F 9/3016* (2013.01); *G06F 9/30043* (2013.01)
(58) Field of Classification Search
CPC .......................... G06F 9/3016; G06F 9/30043
See application file for complete search history.

(56) References Cited

U.S. PATENT DOCUMENTS

| | | | | |
|---|---|---|---|---|
| 5,745,729 A * | 4/1998 | Greenley | ............... | G06F 9/3875 |
| | | | | 712/E9.046 |
| 6,389,529 B1 * | 5/2002 | Arimilli | ................ | G06F 9/3824 |
| | | | | 712/E9.046 |
| 9,990,301 B1 * | 6/2018 | Kanaujia | ............. | G06F 12/0891 |
| 2017/0269935 A1 * | 9/2017 | Ould-Ahmed-Vall | ....................... | |
| | | | | G06F 9/3455 |

OTHER PUBLICATIONS

TW-201810046-A, Mar. 16, 2018, TW, Chang C, G06F12/0802 (Year: 2018).*
Robert Bedichek, "Some Efficient Architecture Simulation Techniques," Proceedings of the Winter 1990 USENIX Conference, Jan. 22-26, 1990, 12 pages.
Mark Horowitz et al., "Informing Loads: Enabling Software to Observe and React to Memory Behavior", Technical Report: CSL-TR-95-673, Computer Systems Laboratory, Department of Electrical Engineering and Computer Science, Stanford University, Stanford, California, July 1995, 24 pages.

* cited by examiner

*Primary Examiner* — Farley Abad
(74) *Attorney, Agent, or Firm* — NIXON & VANDERHYE P.C.

(57) ABSTRACT

A data processing apparatus comprises an instruction decoder and processing circuitry. The processing circuitry is configured to perform a load-with-substitution operation in response to the instruction decoder decoding a load-with-substitution instruction specifying an address and a destination register. In the load-with-substitution operation, the processing circuitry is configured to issue a request to obtain target data corresponding to the address from one or more caches. In response to the request hitting in a given cache belonging to a subset of the one or more caches, the processing circuitry is configured to provide to the destination register of the load-with-substitution instruction the target data obtained from the given cache. In response to the request missing in each cache belonging to the subset of the one or more caches, the processing circuitry is configured to provide a substitute value as the correct architectural result corresponding to the destination register of the load-with-substitution instruction.

14 Claims, 7 Drawing Sheets

LOAD-WITH-SUBSTITUTION INSTRUCTION

BACKGROUND

Technical Field

The present technique relates to the field of data processing.

Technical Background

Many modern data processors include caches to temporarily store data corresponding to addresses in memory, to allow the data to be accessed more quickly than if the data were to be retrieved from memory. However, when an item of requested data is found to not be stored in the cache, processing of further instructions depending on that data may be delayed whilst the data is retrieved from a further cache or memory. It would be desirable to reduce the performance impact of a data access request missing in a cache.

SUMMARY

Viewed from one aspect, the present technique provides data processing apparatus, comprising:
  an instruction decoder to decode instructions; and
  processing circuitry to perform data processing in response to decoding of the instructions by the instruction decoder, wherein:
  the processing circuitry is configured to perform a load-with-substitution operation in response to the instruction decoder decoding a load-with-substitution instruction specifying an address and a destination register, wherein to perform the load-with-substitution operation:
  the processing circuitry is configured to issue a request to obtain target data corresponding to the address from one or more caches,
  in response to the request hitting in a given cache belonging to a subset of the one or more caches, the processing circuitry is configured to provide, as a correct architectural result corresponding to the destination register of the load-with-substitution instruction, the target data obtained from the given cache; and
  in response to the request missing in each cache belonging to the subset of the one or more caches, the processing circuitry is configured to provide a substitute value as the correct architectural result corresponding to the destination register of the load-with-substitution instruction.

Viewed from a further aspect, the present technique provides a non-transitory computer-readable storage medium storing a computer program for controlling a host data processing apparatus to provide an instruction execution environment, the computer program comprising:
  instruction decoding program logic to decode instructions; and
  processing program logic to perform data processing in response to decoding of the instructions by the instruction decoder, wherein:
  the processing program logic is configured to perform a load-with-substitution operation in response to the instruction decoding program logic decoding a load-with-substitution instruction specifying an address and a destination register, wherein to perform the load-with-substitution operation:
  the processing program logic is configured to issue a request to obtain target data corresponding to the address from one or more simulated caches,
  in response to the request hitting in a given simulated cache belonging to a subset of the one or more simulated caches, the processing program logic is configured to provide, as a correct architectural result corresponding to the destination register of the load-with-substitution instruction, the target data obtained from the given simulated cache; and
  in response to the request missing in each simulated cache belonging to the subset of the one or more caches, the processing program logic is configured to provide a substitute value as the correct architectural result corresponding to the destination register of the load-with-substitution instruction.

Viewed from yet another aspect, the present technique provides a data processing method, comprising:
  in response to decoding of a load-with-substitution instruction specifying an address and a destination register, performing a load-with-substitution operation comprising:
  issuing a request to obtain target data corresponding to the address from one or more caches;
  in response to the request hitting in a given cache belonging to a subset of the one or more caches, providing, as a correct architectural result corresponding to the destination register of the load-with-substitution instruction, the target data obtained from the given cache; and
  in response to the request missing in each cache belonging to the subset of the one or more caches, providing a substitute value as the correct architectural result corresponding to the destination register of the load-with-substitution instruction.

Further aspects, features and advantages of the present technique will be apparent from the following description of examples, which is to be read in conjunction with the accompanying drawings.

DESCRIPTION OF EXAMPLES

Figure 1:
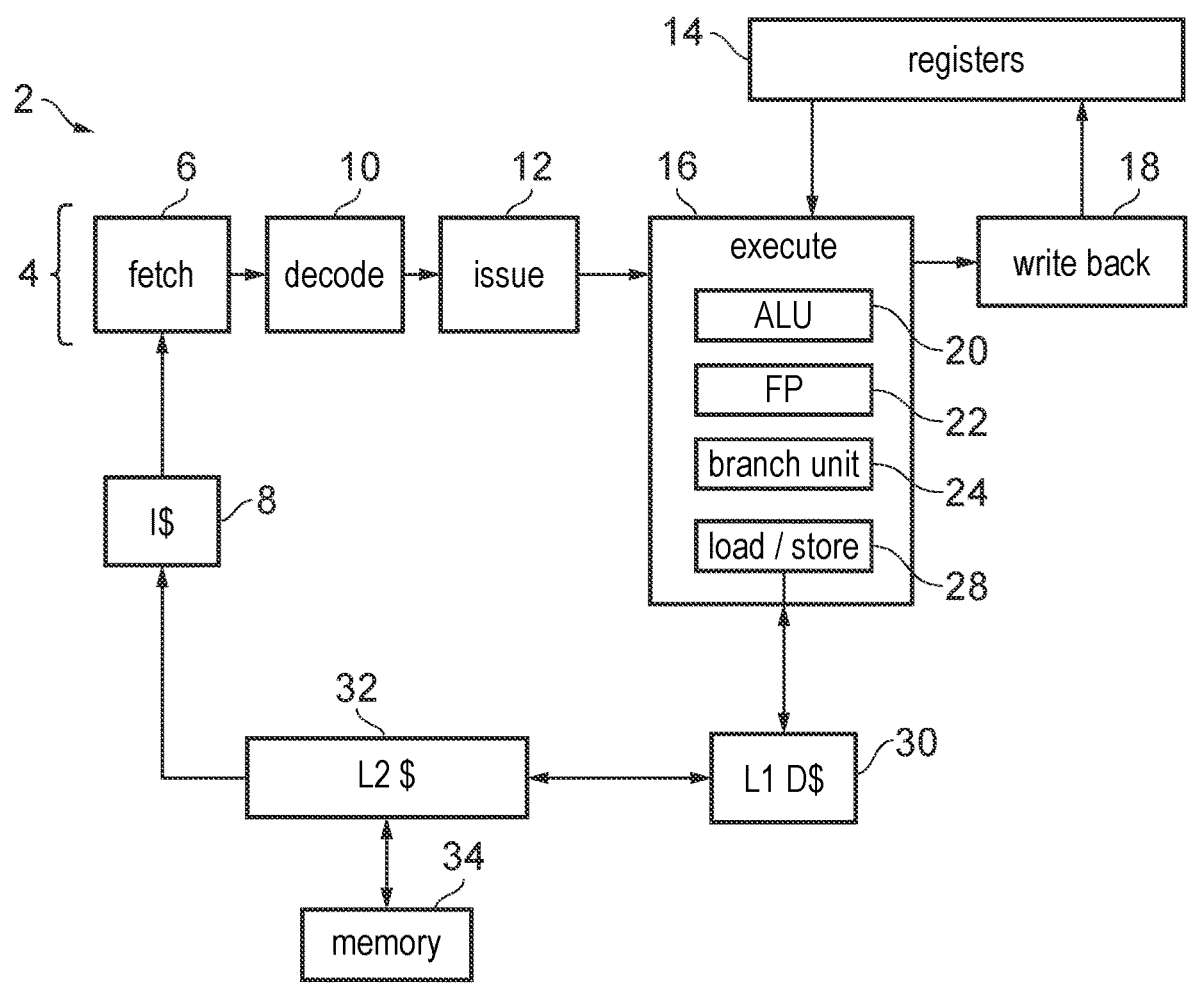
FIG. 1 schematically illustrates an example of a data processing apparatus according to an example of the present technique.

A data processing apparatus according to examples of the present technique comprises an instruction decoder to decode instructions and processing circuitry to perform data processing in response to decoding of the instructions by the instruction decoder. In particular, the instruction decoder is configured to decode a load-with-substitution instruction specifying an address and a destination register. The address may be specified in any of several ways. For example, the full address could be specified in the instruction, or the address may be specified as an offset with respect to a base address stored in a register, such as the program counter. A physical address may be specified, corresponding to locations in a physical memory, or a virtual address may be specified, to be translated to a physical address before memory is accessed. The destination register can similarly be specified in different ways. It is sufficient that the address and destination register can be identified based on the information provided in the load-with-substitution instruction.

At least in certain modes of operation, in response to the instruction decoder decoding the load-with-substitution instruction, the processing circuitry is configured to perform a load-with-substitution operation. In the load-with-substitution operation, the processing circuitry is configured to issue a request to obtain target data corresponding to the address specified by the load-with-substitution instruction from one or more caches. In response to a request hitting in a cache belonging to a subset of the one or more caches, the processing circuitry is configured to provide, as a correct architectural result corresponding to the destination register of the load-with-substitution instruction, the target data obtained from the given cache. That is, when a lookup carried out in response to the load-with-substitution instruction hits against an entry in one of the caches in the subset of caches, the target data stored in the hit entry is retrieved from the cache and provided to the destination register of the load-with-substitution instruction. In some examples, lookups may be carried out in order from a highest level cache to a lowest level cache, with lookups in lower level caches only being performed if the previous lookup in the next highest level cache missed. A higher level cache is one which is encountered before a lower level cache by access requests issued from a processor to memory. The highest level cache may be referred to as the level one cache. In other examples, to reduce the time taken to return data in response to an access request, lookups in lower level caches may be performed speculatively without waiting for an indication that a higher level cache encountered a miss, in which case in response to the request hitting in more than one of the subset of caches, the data obtained from the highest level cache may be provided to the destination register, as this data may be returned the fastest.

In response to a request missing in each cache in the subset of caches, the processing circuitry is configured to provide a substitute value as the correct architectural result corresponding to the destination register of the load-with-substitution instruction. As the examples below will illustrate, the substitute value may be a value which is accessible to the processing circuitry faster than waiting for data to be returned from a cache or memory accessed when missing in the subset of caches. For example, it could be a value which the processing circuitry has access to prior to execution of the load-with-substitution instruction. Use of the substitution value on a cache miss may therefore mean that, rather than waiting for data to be retrieved from a further level of cache (a lower level cache, which may take longer to access) or memory, which may both be associated with delays, the correct architectural result of the load-with-substitution instruction can be provided more quickly.

It would appear to be highly unusual to provide an architectural instruction specifying an address which has different correct architectural results based on whether or not data corresponding to the address is present in a subset of caches. This would mean that the outcome of an architectural instruction would depend on microarchitectural aspects of an apparatus, as microarchitecture may determine whether a particular item of data is cached or not since the microarchitecture can contribute to the decisions regarding when data is allocated, prefetched or otherwise stored in caches and when data is evicted from caches. Therefore, providing an instruction having an outcome which depends on whether a request hits in a cache or not leads to the unusual result that the architectural outcome of an instruction may vary depending on which apparatus is used to run code including the instruction. However, the inventor of the present technique has realised that there are situations where such an instruction may be of use. In particular, it has been realised that there are certain situations where, for a particular section of code, it would be preferable to use target data loaded from a cache, but that if the target data is unavailable in a subset of caches then processing a substitute value instead of the target data can lead to acceptable results and avoid waiting for the target data to be retrieved. Examples where this situation arises will be discussed below with reference to the Figures, and include determining whether enqueue or dequeue operations in a circular buffer should be allowed to proceed based on a pointer loaded with the load-with-substitution instruction. Therefore, providing a load-with-substitution instruction which causes processing circuitry to perform a load-with-substitution operation can provide performance benefits by reducing the impact of cache misses.

In some examples, the destination register specified by the load-with-substitution instruction is an architectural destination register. Due to register renaming which may take place to allow instructions to be executed out of order, one of several different physical registers may be used as the destination register. The mapping between physical registers and architectural registers may change at different points during execution of a program. For example, a new physical register may be mapped to a given architectural register each time an instruction is encountered which causes data to be written to the given architectural register. Due to this remapping, data associated with the same architectural register at different moments of program flow may be mapped to different physical registers.

The substitute value is not particularly limited, and different implementations of the load-with-substitution operation may provide different substitute values. In some examples, the substitute value comprises a previous data value associated with the architectural destination register prior to the load-with-substitution instruction. Providing a load-with-substitution instruction for which the substitute value is the previous value of the architectural destination register may enable a particularly efficient instruction encoding, as there is no requirement to identify a further value to be used as a substitute value, separate from the field used to encode the destination register.

For example, in response to the load-with-substitution instruction the processing circuitry may attempt to load data from a cache to an architectural destination register but if the request misses in a subset of caches then the data previously assigned to the architectural destination register may be used as the correct result of the load-with-substitution instruction. If the mapping between physical and architectural registers is updated in response to the load-with-substitution instruction, for example because in an implementation supporting register renaming the load-with-substitution may cause data to be written to a register and therefore may cause a new physical register to be assigned to the destination architectural register, then data may be physically moved from one physical register to another physical register whilst still remaining assigned to the same architectural destination register. However, in examples not supporting register renaming, the substitute value may be the data value associated with the previous physical destination register, which is left unchanged in the case of a cache miss in the subset of caches.

The previous data value associated with the architectural destination register may be the value associated with the architectural destination register immediately prior to the execution of the load-with-substitution instruction, such as the state of the architectural destination register after completion of all instructions prior to the load-with-substitution instruction in the program order. In other words, the function of the load-with-substitution operation is to cause the architectural destination register to transition from an input state to an output state. When a cache request hits in one of a subset of caches, the output state of the architectural destination register is based on target data, associated with the specified address, retrieved from the hit cache. However, when the cache requests miss in a subset of caches, the output state of the architectural destination register may be based on (for example, equal to) the input state of the architectural destination register.

In an alternative example of the present technique, the substitute value comprises a data value associated with a further register specified by the load-with-substitution instruction. That is, the load-with-substitution instruction may specify an address, a destination register, and a further register. The output state of the architectural destination register may be based on the target data associated with the address retrieved from the subset of caches or the data stored in the further register, based on whether requests hit in a subset of caches. Providing an instruction which enables identification of a further register for the substitute value may increase the flexibility of the load-with-substitute instruction by increasing the range of values which may be chosen as the substitute value. This can provide a programmer with a choice of substitute values which may be chosen depending on a wide range of different use cases. Note that, while a field may be provided in the instruction to specify a further register, this does not exclude a particular program designer setting that field to indicate the same register as the destination register, so that the substitute value still comprises the previous value of the destination register. In all examples, a data value "associated with" a register may be a value stored in that register. However, when implemented in an apparatus using operand forwarding, values associated with an architectural register may also include a value generated by a previous instruction without having to read the value from the physical register associated with the architectural register, the forwarded value being the same as if it were read from the architectural register after completion of the previous instructions.

In further examples, the substitute value may not be a value associated with a register identified by the load-with-substitution instruction. For example, a substitute value could be specified as an immediate value in the encoding of the load-with-substitute instruction. In other examples the substitute value could always be the same value, such as all ones. The substitute value may therefore take a predetermined value, which does not need to be explicitly encoded in the instruction. The predetermined value could, for example, take a form that allows software to differentiate the predetermined value from a value loaded into the destination register from a cache. This may allow software to determine when the request has missed in the subset of the caches. For example, if the load instruction is expected to return an address from a cache in response to the load-with-substitution instruction, then the predetermined value may be a value outside of a range of valid addresses which could be returned, allowing it to be identified as a predetermined value. This may present a mechanism by which the load-with-substitution instruction can be used to inform software whether or not data associated with a particular address is stored in a subset of caches.

As illustrated in the examples provided above, in some examples the location from which the processing circuitry obtains the substitute value may be independent of the address specified by the load-with-substitution instruction. The substitute value may be selected based on the specified destination register, a further register, or a predetermined value, but the bit pattern used for specifying the substitute value may be independent of the address specified by the load-with-substitution instruction (although whether the substitute value is assigned to the destination register instead of the target data does depend indirectly on the address, based on whether or not that address encounters a hit or miss in the subset of caches).

The processing circuitry is configured is a way which enables it to perform the load-with-substitution operation. In certain examples, the processing circuitry performs the load-with-substitution operation each time the instruction decoder decodes the load-with-substitution instruction.

However, in certain cases a software designer may wish for the load-with-substitution instruction to cause an operation other than the load-with-substitution operation. For example, there may be instances of workloads where it is desired for the load-with-substitute instruction to always return the target data to the destination register, and not cause the substitute value to be used. There may also be cases where whether it is best to return the target data or the substitute value on a miss in the subset of caches depends on what other workloads are being performed in parallel on other processors in the same system, which might be contending for access to the address specified by the load-with-substitute instruction.

Therefore, the processing circuitry may be configured to selectively perform the load-with-substitution operation or a load-without-substitution operation in response to the instruction decoder decoding the load-with-substitution instruction. To perform the load-without-substitution operation the processing circuitry may be configured to issue the request to obtain target data corresponding to the address from one or more caches and to provide, as the correct architectural result corresponding to the destination register of the load-with-substitution instruction, the target data irrespective of whether the request hits in the subset of the one or more caches. Providing the option in hardware to support dynamically deciding whether the load-with-substitution instruction should trigger a load-with-substitution or load-without-substitution operation increases the flexibility in using the load-with-substitution instruction, since the same instruction can behave in different ways depending on information available at runtime. The request to obtain the target data corresponding to the address may also be sent to memory, so that the target data can be retrieved from memory (for example, if it is not present in one of the caches as discussed below).

In the miss case for the load-without-substitution operation, the processing circuitry may retrieve the target data from a further level of cache or from the memory so that it can be provided to the destination register. Therefore, when using the load-without-substitution operation, subsequent instructions may be delayed until the target data is retrieved. If the target data is not in the subset of caches then the subsequent instructions may be delayed longer than if the load-with-substitution operation were performed. The decision over whether to perform the load-with-substitution operation or the load-without-substitution operation in response to decoding the load-with-substitution instruction may be based on a configuration input. For example, the configuration input may comprise information provided to the processing circuitry from an external source such as memory or a network, information provided by hint instructions earlier in the same workload as the load-with-substitution instruction, and/or information gathered at runtime based on observations of the execution of instructions (for example, performance monitoring data). Therefore, the actual operation performed in response to the load-with-substitution instruction may vary dynamically based on a configuration input, and this can be used to select between a load-with-substitute operation which may return a value more quickly, and which may return a substitute value, and a load-without-substitute operation which may return a value more slowly but will only return the target data.

Whilst the substitute value can be used as the correct architectural result instead of the target data for performance reasons for an instance of the load-with-substitute instruction where the request misses in the subset of caches, it may nevertheless be desirable to have the target data loaded into the subset of caches so that the target data can be returned more quickly in response to a future instance of the load-with-substitute instruction (or indeed any load instruction). Therefore, in some examples, in response to the request missing in each cache belonging to the subset of the one or more caches, the processing circuitry may be configured to perform a speculative linefill operation to retrieve the target data from a further cache or memory and allocate the target data into a cache in the subset of the one or more caches. The speculative linefill operation is speculative since it retrieves target data to the subset of caches in the expectation that a future instruction may request the data, but the returned data is not used for the current instruction. The speculative linefill can therefore be considered to prefetch the target data into the cache for a future instruction. The data returned in the speculative linefill operation is not returned to the destination register, and therefore this operation does not affect the architectural result of the load-with-substitution instruction which caused it to be carried out. In some examples, prefetch circuitry may be provided to perform the speculative linefill operation. The speculative linefill operation may be based on a request to access the target data from a further cache or memory that was issued at the same time as the request to obtain the target data from one or more caches. The data returned from the further cache or memory may not be used unless the speculative linefill operation is performed. Alternatively, the speculative linefill operation may cause separate access requests to be issued to a further cache or memory to retrieve the target data after it has been determined that the request missed in the subset of caches.

In some cases, the speculative linefill operation may not always be performed in response to the requests missing in each cache belonging to the subset of the one or more caches. For example, the speculative linefill operation may interfere with writes by other processing circuitry in a data processing system. When there are two or more CPUs in a system, each with private caches, then to ensure coherency in the system a write by one CPU may require invalidating all shared copies of the cache line before the write can be performed. The write operation may be performed more quickly if there is not a copy of the data in a cache associated with the processing circuitry which executed the load-with-substitution instruction, and therefore suppressing the linefill may allow writes by other processing circuitry to be performed more quickly. In addition, the speculative linefill operation may cause certain information to be evicted from the cache. This evicted information will take longer to access if it is requested in a future instruction, and therefore future instructions may encounter increased delay due to the eviction caused by the speculative linefill operation. Therefore, in some cases it may be preferable to suppress the speculative linefill operation. The selection between performing or suppressing the speculative linefill may be made on the basis of a linefill configuration input. For example, the linefill configuration input may comprise information provided to the processing circuitry from an external source such as memory or a network, information provided by hint instructions earlier in the same workload as the load-with-substitution instruction, and/or information gathered at runtime based on observations of the execution of instructions (for example, performance monitoring data). For example, performance monitoring circuitry may observe that processing of a workflow has been able to progress using substitute values, and therefore that there may be minimal advantage to performing the speculative linefill operation, so the performance monitoring circuitry may provide the linefill configuration input indicating that the speculative linefill operation should be suppressed. In other examples, the linefill configuration input may be based on tracking the fraction of allocations of the speculatively linefilled data that actually get read before being evicted and/or tracking how many of the speculative linefills cause data to be evicted to determine how useful it is to perform the speculative linefill.

In examples where the speculative linefill operation is performed, in response to the request missing in each cache belonging to the subset of the one or more caches the processing circuitry may allow a subsequent dependent instruction, which is dependent on the destination register of the load-with-substitution instruction, to be executed before the speculative linefill operation has retrieved the target data. Instructions which follow the load-with-substitution instruction in the program order, and which depend on the value of the architectural destination register, may be executed without waiting for the speculative linefill operation. Since the speculative linefill operation does not affect the correct architectural result of the instruction, the subsequent instructions do not need to wait for it to complete. This helps to improve performance compared to a type of load which, when the load misses in a subset of caches, defers subsequent dependent instructions until a linefill has returned the required target data.

In the examples discussed above, the load-with-substitution operation provides different architectural results based on whether a request hits in a subset of caches. In some examples, the subset of caches may simply be every cache on the path between the processing circuitry and memory. For example, this may be the case when there are few caches (such as only a single cache) between the processing circuitry and the memory.

However, in other cases the subset of the one or more caches is a proper subset, excluding some of the caches in the one or more caches. The subset of caches may include the highest levels of cache and the caches excluded from the subset may begin from the lowest level of cache, so that if one cache is excluded it is the lowest level of cache, if two caches are excluded they include the two lowest levels of cache, and so on. This is because the time to return data from a cache may increase the lower that cache is in the cache hierarchy. An advantage of using the substitute value is that data can be provided quickly—in the hit case, the data can be returned quickly from a cache and in a miss case the substitute value can be provided quickly. However, if the subset of caches includes caches which are associated with a high latency, then there may be high latency associated with the hit case. On the other hand, if the subset includes too few caches then requests may more frequently miss in the subset of caches and the load-with-substitution instruction may therefore only rarely return a value other than the substitute value, which can sometimes decrease performance if the substitute value fails a test that the target data for the load target address would have passed, say. The selection of caches in the subset of caches therefore trades off increased likelihood of finding the target data in a cache with the increased delay associated with returning the target data, as the number of caches in the subset increases to include caches lower in the cache hierarchy. The subset of caches may be selected based on what amount of latency is considered to be an acceptable worst case delay for the load-with-substitution instruction. The number of caches in the subset may depend on implementation, as the capacity and latency of caches may vary between devices.

In some cases the subset of the one or more caches comprises at least a level one cache associated with the processing circuitry. This is the highest level of cache, and the first cache encountered on the path from the processor to memory. This cache may therefore be associated with the lowest latency.

Some examples of a data processing apparatus may also include a store buffer where data is stored in advance of the data being written to memory. In some examples, data may be returned from a store buffer in response to an access request. Therefore, in some examples the request issued in response to the load-with-substitution instruction is also issued to the store buffer, and in some cases if the data is found to be in the store buffer then this may be considered in the same way as a hit in the subset of caches, and the processing circuitry may provide, as the correct architectural result corresponding to the destination register, the target data obtained from the store buffer.

The instruction decoder may support more than one variant of the load-with-substitution instruction. For example, different load-with-substitution instructions may be provided with different opcodes. In some examples, in response to the instruction decoder decoding a second variant of the load-with-substitution instruction, the processing circuitry is configured to impose a stricter ordering requirement between the load-with-substitution instruction and other load/store operations than is imposed in response to the instruction decoder decoding a first variant of the load-with-substitution instruction. For example, the ordering requirement may determine when explicit memory accesses are observed. In some examples, in response to the first variant there may be no ordering requirement. However, in response to the second variant there may be a requirement that certain explicit memory accesses (for example, all explicit memory accesses) following the load-with-substitution instruction in the program order should be observed after the load-with-substitution instruction. However, the same restriction may not apply to memory accesses before the load-with-substitution instruction in the program order, which may be observed before or after the load-with-substitution instruction. In some examples, the other load/store operations include both load and store operations. Alternatively, they could be only load operations or only store operations. The second variant of the load-with-substitution instruction may cause the processing circuitry to impose the same ordering requirement as a load-acquire instruction. By providing the second variant of the load-with-substitution instruction, this allows the advantages of the load-with-substitution operation discussed above to be achieved even in a use case where it is important, for memory consistency reasons, to impose at least one ordering requirement.

Particular examples will now be described with reference to the Figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

In response to the instruction decoder 10 decoding a load-with-substitution instruction specifying an address and a destination register, the processing circuitry 16 may be configured to perform a load-with-substitution operation. In the load-with-substitution operation, the processing circuitry, in particular the load/store unit (LSU) 28, is configured to issue a request to obtain target data corresponding to the address from the memory system 30, 32, 34. Depending on the specific implementation, either the L1 cache 30 or both of the L1 cache 30 and the L2 cache 32 may be considered to be in a subset of the caches. In response to an access request for a given address, a cache may perform a lookup to determine whether that cache contains an entry corresponding to the given address. If the requests issued by the LSU 28 result in a hit in a cache in the subset of caches, then the target data corresponding to the specified address may be returned from the hit cache to the destination register specified by the load-with-substitution instruction. However, if the requests miss in the subset of caches (even if a request hits in a cache not in the subset of caches, e.g., even if the cache lookup hits against an entry in the L2 cache when the subset only includes the L1 cache), then the target data is not returned from the memory system to the destination register. Instead, in the load-with-substitution operation the processing circuitry provides in the destination register, as the correct architectural result of the load-with-substitution instruction, a substitute value. The substitute value is not particularly limited, but may be a value accessible to the processing circuitry prior to execution of the load-with-substitution instruction. For example, the substitute value may be the value stored in the architectural destination register prior to executing the load-with-substitution instruction. In this case, in response to the requests missing in the subset of caches, the destination architectural register after the load-with-substitution instruction may store the value stored in the destination architectural register prior to the load-with-substitution instruction. It is to be noted that in examples where register renaming is used to support out-of-order processing, the architectural destination register before and after the load-with-substitution instruction is processed may correspond to different physical registers of the registers 14 and therefore data may be moved between physical registers whilst remaining in the same architectural register. The substitute value may alternatively be a value stored in a further register of the registers 14, where the further register is identified in the encoding of the load-with-substitution instruction. Alternatively, the substitute value may be a predetermined value such as a value specified as an immediate in the encoding of the load-with-substitution instruction or a fixed value such as all zeros or all ones. In each case, it may be quicker to return a substitute value than to retrieve the target data from a further level of cache or memory, so by providing the substitute value as the correct architectural result of the load-with-substitution instruction, the load-with-substitution instruction can be completed earlier than if the data were returned from a further level of cache 32 or memory 34.

Figure 2:
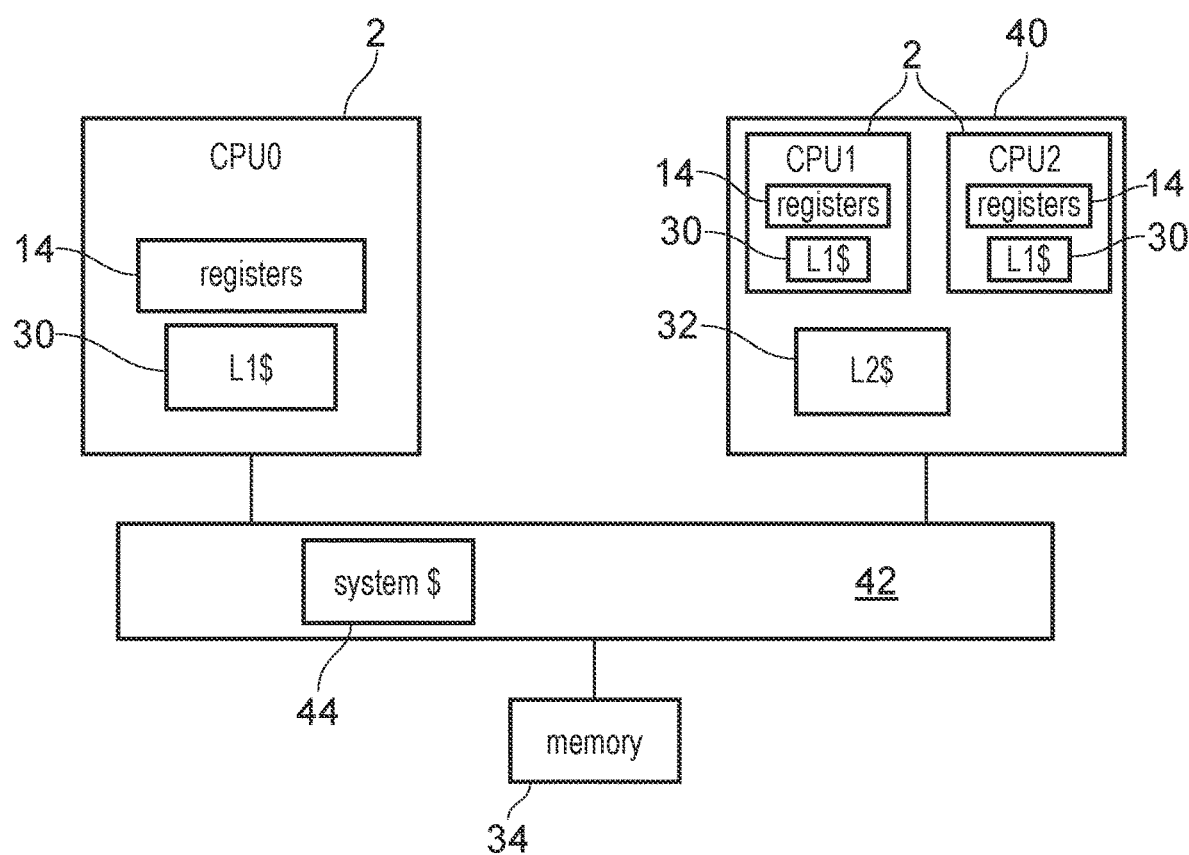
FIG. 2 schematically illustrates an example of a data processing system.

As discussed earlier, there are certain situations where, for a particular section of code, it would be preferable to use target data loaded from a cache, but if the target data is unavailable in a subset of caches then using a substitute value instead can lead to acceptable results and avoid waiting for the target data to be retrieved. An apparatus in which an example use case arises is illustrated in FIG. 2, which illustrates a data processing system comprising three requester devices (CPUs) 2 (each of which may comprise the processing pipeline illustrated in FIG. 1, although this is not shown in FIG. 2 for simplicity). Each CPU 2 may comprise registers 14 and one or more caches including a level one data cache 30. Certain CPUs 2 may be combined in a cluster 40, which may comprise further levels of cache such as a level 2 cache 32 which is shared between devices in the cluster. The system also comprises an interconnect 42 for managing coherency between the requester devices and other caches. Although not shown, the requester devices could also include, in addition to CPUs, a graphics processing unit (GPU) for performing graphics processing and a network interface controller (NIC) for controlling transmission and reception of data over a network, display controllers for controlling display of data on a screen, or a DMA (direct memory access) controller for controlling transfer of data between memory and a peripheral device for example. A system cache 44 is coupled to the coherent interconnect 42 but not assigned to a particular requester device. The system cache 44 may, for example, be provided to speed up access to data by uncached requesters such as a NIC, allowing faster access than if all reads and writes from the NIC have to be served by main memory 34.

Figure 3A:
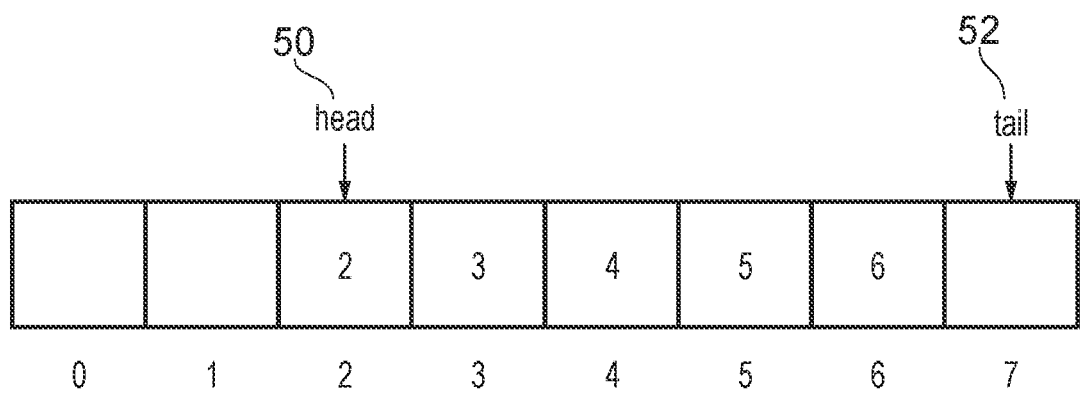
FIGS. 3A and 3B schematically illustrate examples of a circular buffer.
Figure 3B:
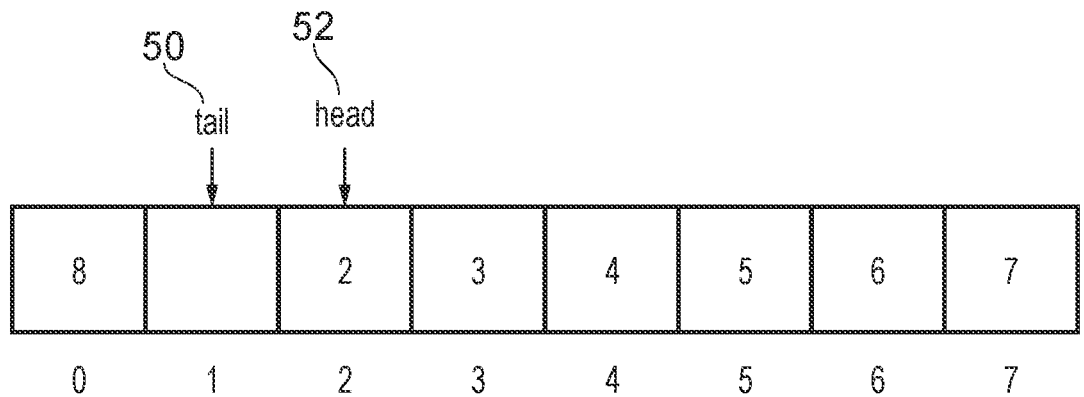

One mechanism which may be used to communicate data between requesters is use of a data structure in memory 34. As a particular example of such a data structure, a circular buffer may be used to communicate between requesters. The circular buffer is a first-in-first-out buffer having a certain number of elements. Data is written to the circular buffer as if the buffer were connected end-to-end, such that the first element of the buffer is the next write location after writing to the last element of the buffer. Each element of the buffer is associated with a memory address, which need not be contiguous in memory. Requesters may write to the circular buffer, and other requesters may read from the circular buffer to allow data to be communicated between the requesters. In order for the requesters to know which memory address is the next location for writing to the buffer, and which address is the next location for reading from the buffer, two pointer values may also be stored in memory. Pointers may be memory addresses corresponding to an entry of the buffer or may be another value which identifies an entry of the buffer and which can be mapped to a memory address of the identified entry (for example, the pointer may be an entry index which can be used to calculate the address of the entry relative to a base address of the buffer structure). The tail pointer points to the next write location and the head pointer points to the next read location. An enqueue operation is performed to write a new element to the buffer, following which the tail pointer is updated to point to the next element as the next write location. A dequeue operation is performed to read an element from the buffer, after which the head pointer is updated to point to the next element as the next read location. An example of a circular buffer is illustrated in FIGS. 3A and 3B, although it will be appreciated that this diagram is merely schematic—the head pointer 50 and the tail pointer 52 are in fact values stored in the memory system, and the buffer locations are similarly locations in a memory system. The circular buffer illustrated in FIGS. 3A and 3B contains eight elements which have been numbered from 0 to 7 for illustration. Each element is associated with a location in memory. The tail pointer 52 and head pointer 50 may be memory addresses directly pointing to an entry of the buffer or may be counter values which can be mapped to an entry of the buffer. If the counters wraparound at a value larger than the number of elements of the buffer, then the counter values may be combined with a mask (such as, in the case of an eight element buffer, a mask with ones in the lowest three places) to identify an entry of the buffer. The buffer is written to and read in order by the group of producers/consumers which have access to the buffer, so that when the pointers are counters the next write/read location is given by incrementing the previous value of the tail/head pointer. FIG. 3A illustrates an example in which seven data elements 0-6 have been written to the circular buffer and two data elements 0-1 have been read from the buffer. This means that the next write location is the buffer entry 7 and the next read location is buffer entry 2. The buffer entries still storing valid data (i.e. 2 to 6) are shown with the numbers indicated in the entry. In FIG. 3B, two further elements have been written to the circular buffer compared to the example of FIG. 3A. It will be seen that data element 8 has been written to buffer entry 0 due to the circular nature of the buffer.

A dequeue operation to read from an empty buffer may not be allowed. Similarly, an enqueue operation to write to a full buffer (thereby overwriting valid data already stored in the buffer) may not be allowed. Both of these conditions can be identified using the head pointer 50 and tail pointer 52. For example if, based on a comparison of the head pointer and the tail pointer, the tail pointer is found to be equal to the head pointer then the buffer is determined to be empty. If the pointers are provided as counters which can count to values larger than the number of elements in the buffer, then the buffer may be determined to be full when the tail pointer is found to be larger than the head pointer by an amount equal to the number of elements in the buffer. In other examples, such as when the pointers are addresses or counters which cannot count to values larger than the number of elements in the buffer, the buffer may be determined to be full in other ways. For example, if the head and tail pointers are equal and a flag is set that the buffer contains at least one entry, then it can be determined that the buffer is full.

In the system illustrated in FIG. 2, a requester 2 which performs enqueue operations may be referred to as a producer and a requester 2 which performs dequeue operations may be referred to as a consumer. Prior to performing an enqueue operation the producer may need to determine that the buffer is not full and prior to performing a dequeue operation the consumer may need to determine that the buffer is not empty. Therefore, a consumer or producer may need a copy of both the head pointer and the tail pointer to perform a comparison between the two values prior to performing an enqueue or dequeue operation.

Whilst the head and tail pointers are stored in memory, they may be cached in a cache associated with a requester when they are loaded to perform an enqueue or dequeue operation by that requester, so that a future enqueue or dequeue operation performed by the same requester can have quicker access to the pointers. The pointers will also be loaded into registers 14 of the requester performing the enqueue or dequeue operation to perform the comparison. However, since the circular buffer may be used to communicate between different requesters, it is likely that multiple requesters will be simultaneously performing enqueue or dequeue operations with respect to the same circular buffer. For example, there may be one requester acting as a producer sending information to a second requester acting as a consumer, each requester accessing the circular buffer in turn. Similarly, there may be two or more producers and/or two or more consumers accessing the same buffer. For coherency between data values stored throughout a system, the coherent interconnect 42 may enforce a coherency protocol to invalidate out-of-date copies of data stored in caches. Therefore, when a producer performs an enqueue operation and updates the tail pointer, copies of the tail pointer cached in the caches of other requesters may be invalidated. Similarly, when a consumer performs a dequeue operation and updates the head pointer, copies of the head pointer cached at other requesters may be invalidated. This means that in a series of enqueue and dequeue operations, even if a requester previously held a cached copy of both the head pointer and tail pointer, then following an enqueue or dequeue operation at a different requester, it is likely that at least one of the two cached pointers has been invalidated for cache coherency. This means that to perform an enqueue or dequeue operation, the requester may be required to fetch at least one pointer from memory, and delay processing until the at least one pointer has been returned.

Figure 4A:
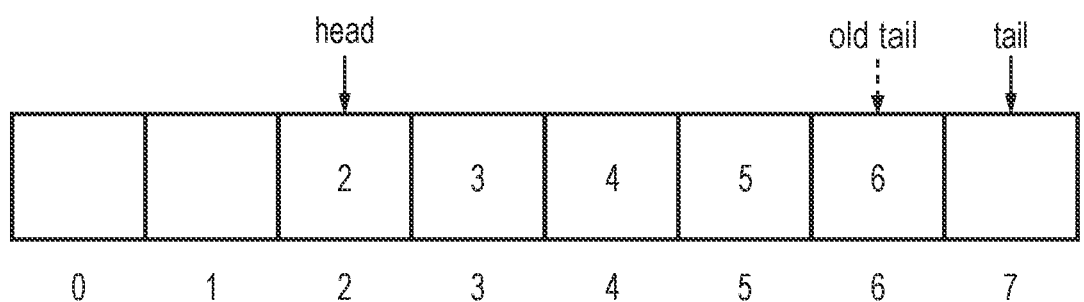
FIGS. 4A and 4B schematically illustrate the use of out-of-date data values for checking whether enqueue and dequeue operations are allowed in a circular buffer.
Figure 4B:
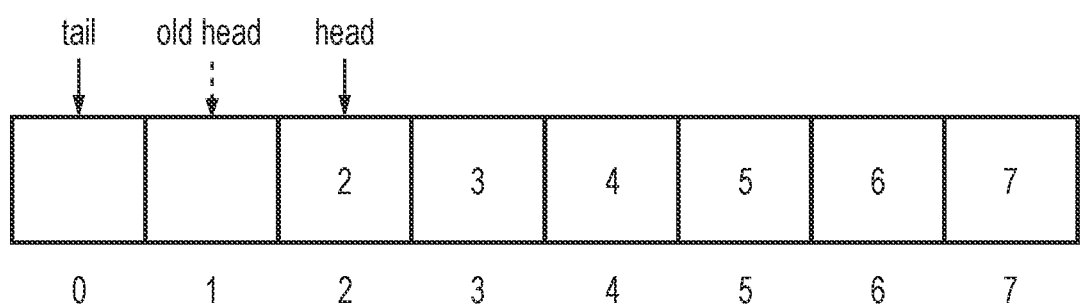

Both of the head and tail pointers are generally incremented in one direction and not the other. Therefore, to perform a dequeue operation it may be acceptable to use an out-of-date tail pointer (the head pointer should be up-to-date so it is known which element to access). This is because if the old tail pointer is ahead of the current head pointer, it may be acceptable to assume that there is at least one element in the circular buffer as the new tail pointer should be ahead of the old tail pointer, as illustrated in FIG. 4A. Similarly, as illustrated in FIG. 4B, an out-of-date head pointer can be used to determine whether an enqueue operation should be allowed to proceed (an up-to-date tail pointer is needed to know where to write the new data). The old head pointer should be behind the up-to-date head pointer, so it may be sufficient to compare the tail pointer to the old head pointer to avoid overwriting valid data in the buffer. Hence, in both the enqueue and dequeue operations one of the two pointers is allowed to be out of date in a test to determine whether the operation should be allowed. Whilst this may provide a pessimistic test (sometimes the enqueue or dequeue operation may be prevented when based on up-to-date pointers it should be allowed), it should not allow an enqueue or dequeue operation to take place when it should be prevented.

Therefore, the tests to determine if an enqueue or dequeue operation can be performed may provide a use case for the load-with-substitution instruction.

An example is provided below illustrating a series of enqueue and dequeue operations between a single producer and a single consumer. The values of the head pointer and tail pointer according to the level one cache and registers of the respective requester are shown after each operation.

|  | Producer | | | | Consumer | | | |
| --- | --- | --- | --- | --- | --- | --- | --- | --- |
|  | Cache | | Register | | Cache | | Register | |
| Operation | Tail | Head | Tail | Head | Tail | Head | Tail | Head |
| Enqueue 1 | 1 | 0 | 1 | 0 | — | — | — | — |
| Enqueue 2 | 2 | 0 | 2 | 0 | — | — | — | — |
| Dequeue 1 | 2 | — | 2 | 0 | 2 | 1 | 2 | 1 |
| Enqueue 3 | 3 | 1 | 3 | 1 | — | 1 | 2 | 1 |
| Dequeue 2 | 3 | — | 3 | 1 | 3 | 2 | 3 | 2 |

Consider enqueue operation 3, which is to be performed by the producer following dequeue operation 1 performed at the consumer. The values in the caches and registers prior to enqueue operation 3 (immediately following dequeue operation 1) are shown in the dequeue 1 row, wherein the producer has a cached copy of the tail pointer (equal to 2) (and an identical copy stored in the registers) following the earlier enqueue operations 1 and 2. The producer's cached copy of the tail pointer has not been invalidated because the consumer does not update the tail pointer. Prior to enqueue operation 3, the producer does not have access to a valid cached copy of the head pointer as this has been invalidated following the previous dequeue operation 1 performed by the consumer (because the write to the head pointer by the consumer may trigger snoop messages to be sent by the interconnect 42 which cause invalidation of data for the same address at other CPU's caches, according to the coherency protocol being implemented). However, the producer does have a previous value of the head pointer (equal to 0) stored in its registers following the earlier enqueue operations 1 and 2.

For the enqueue operation the producer needs an up-to-date version of the tail pointer but can use an old version of the head pointer to check if the operation is allowed. The producer may not know that it does not have an up-to-date copy of the head pointer (for example, it could be preceded by an enqueue operation that has already cached a copy) and therefore the enqueue operation may first attempt to load a copy of the tail pointer from the cache. Hence, the load-with-substitution instruction can be used in the enqueue operation to load the head pointer, with the subset of caches being, for example, the level one cache only. A load-with-substitution instruction can be used which specifies the address of the head pointer and a destination register. If the old head pointer is stored in the architectural destination register, then a variant of the load-with-substitution instruction may be used which uses the previous value of the destination register as the substitute value. If the old head pointer is located in a different register to the destination register, then that further register may be specified in the load-with-substitution instruction as the location from which to retrieve the substitute value. Either the up-to-date head pointer is found in the cache and is loaded to the head pointer register, or (as is the case for enqueue operation 3 shown above) if the head pointer is not cached then the old head pointer may be used from the registers instead.

Similar considerations apply to the dequeue operation, where the load-with-substitution instruction may be used to load the tail pointer value or substitute in an old value of the tail pointer.

In the above examples, it would be preferable to use the up-to-date pointer values, since these are less likely to prevent the enqueue/dequeue operation to be prevented. For example, as shown in FIG. 4B, whilst the old head value may enable one enqueue operation to be performed, a second enqueue operation may be prevented where the up-to-date head value would allow the second enqueue operation to be performed. However, retrieving the up-to-date pointer values may take time, and as future instructions may depend on the enqueue and dequeue operations, it may be undesirable to wait for the up-to-date values when it is possible to simply use out-of-date values retrieved from the registers instead. Hence, this provides an example in which the load-with-substitution instruction attempts to load a preferred value, but can use an acceptable substitute value if the target data is not in a subset of caches and therefore cannot be loaded quickly enough.

The load-with-substitution instruction may cause a speculative linefill for the target data corresponding to the specified address. This means that if one requester executes the load-with-substitution instruction several times, whilst in the first instance of the instruction, requests may miss in the subset of caches causing a substitute value to be used instead, the first instance may cause a speculative linefill wherein the target data is loaded into the subset of caches such that in the subsequent instances of the instruction, the requests may hit in the subset of caches and more up-to-date data may be returned in response to the load-with-substitution instruction. This can be useful if one requester performs a series of several enqueue or dequeue operations in a row, or if a first comparison to determine if an enqueue/dequeue operation is allowed fails and is later repeated. Whilst comparison for the first enqueue/dequeue operation may be performed on the basis of a pointer stored in a register, the up-to-date pointer may be retrieved so that later enqueue/dequeue operations are not prevented due to the use of an out-of-date pointer.

It is noted that the example corresponding to the circular buffer, as described above, is not the only example in which the load-with-substitution instruction may be used. Many examples may be found where use of a substitute value is preferable to waiting for target data to be retrieved from a further cache or memory if the target data is not in a low latency cache. For example, in an apparatus having a limited amount of internal memory, a processor may decide to move certain pages from internal memory to an external memory. The decisions about which pages to move to an external memory may be based on how frequently those pages are accessed, which may be tracked using counters stored in memory. The counters in memory may only count up, and may be incremented in response to detecting accesses for a corresponding page of memory. Page accesses may be identified using flags set in an MMU, based on which the counters may be periodically updated. To decide which pages to move to external memory, the processor may attempt to read the counters. A load-with-substitute instruction could be used for this purpose since, if the counter cannot be retrieved quickly enough, such as from a cache, it may be sufficient to use an old version of the counters stored in a register or in thread-local/private memory associated with a management thread, as it may be that the old version of the counters will still show the same pattern as the new version, and therefore identify similar pages to be moved to external memory. The use of the load-with-substitute instruction allows this determination to be made more quickly.

More generally, the load-with-substitution instruction can be used to return an approximate value as the substitute value, and can be particularly useful in situations where variables associated with memory addresses change monotonically (i.e., only in one direction) so that if the approximate value is an older version of the value associated with the memory address, this approximate value can provide a lower or upper bound for the true value associated with the address.

Figure 5:
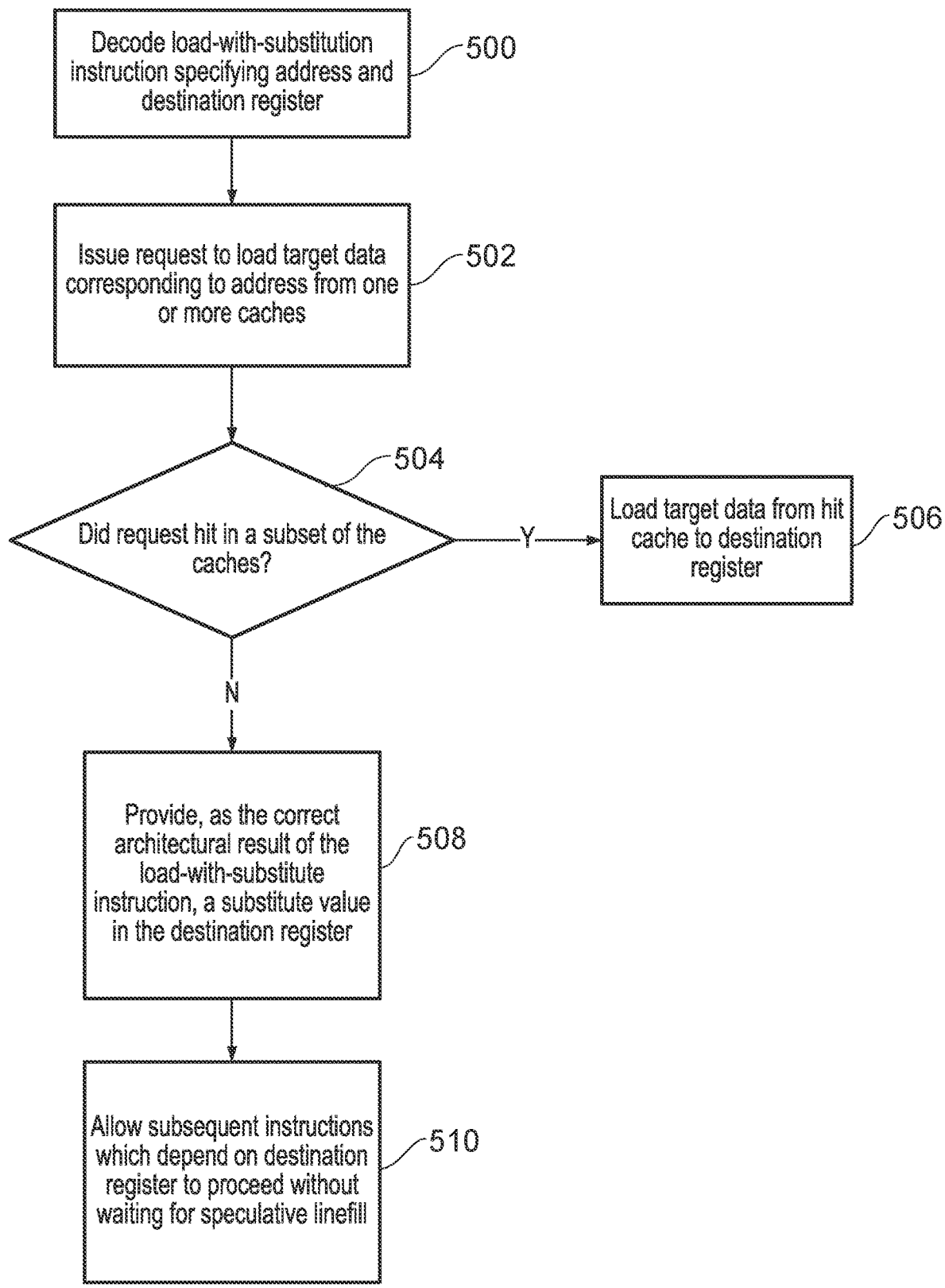
FIGS. 5-7 are flow diagrams illustrating methods in response to decoding a load-with-substitute instruction.

FIG. 5 illustrates a method carried out by a data processing apparatus. At step 500, an instruction decoder 10 decodes a load-with-substitution instruction specifying an address and a destination register. To identify a substitute value, the load-with-substitution may also specify a further register or immediate value in some examples, although this may not be required since the substitute value may be associated with the destination register which is already identified.

At step 502, the processing circuitry performs a load-with-substitution operation. When the load-with-substitution operation is performed, the processing circuitry issues requests to one or more caches to load target data corresponding to the address specified by the load-with-substitution operation from the one or more caches.

At step 504 it is determined whether any of the requests has hit in a cache belonging to a subset of the one or more caches.

If one (or more) of the requests did hit in a subset of the caches, then at step 506 the target data is loaded to the destination register, and provided as the correct architectural result of the load-with-substitution instruction, from the location in the (highest level hit) cache corresponding to the address specified by the load-with-substitution instruction.

However, if none of the requests hit in the subset of caches, then at step 508 the processing circuitry is configured to provide in the destination register, as the correct architectural result of the load-with-substitution instruction, a substitute value. The substitute value may be the previous value of the architectural destination register, a value associated with a further register identified by the load-with-substitution instruction, or a predetermined value, for example.

At step 510, subsequent instructions which depend on the destination register are allowed to proceed without waiting for a speculative linefill operation to complete. The speculative linefill operation may or may not be performed to fetch the target data into the subset of caches depending on a linefill configuration input, although since the architectural result of the load-with-substitution instruction does not depend on completion of the speculative linefill operation, its completion is not required to perform subsequent instructions.

Figure 6:
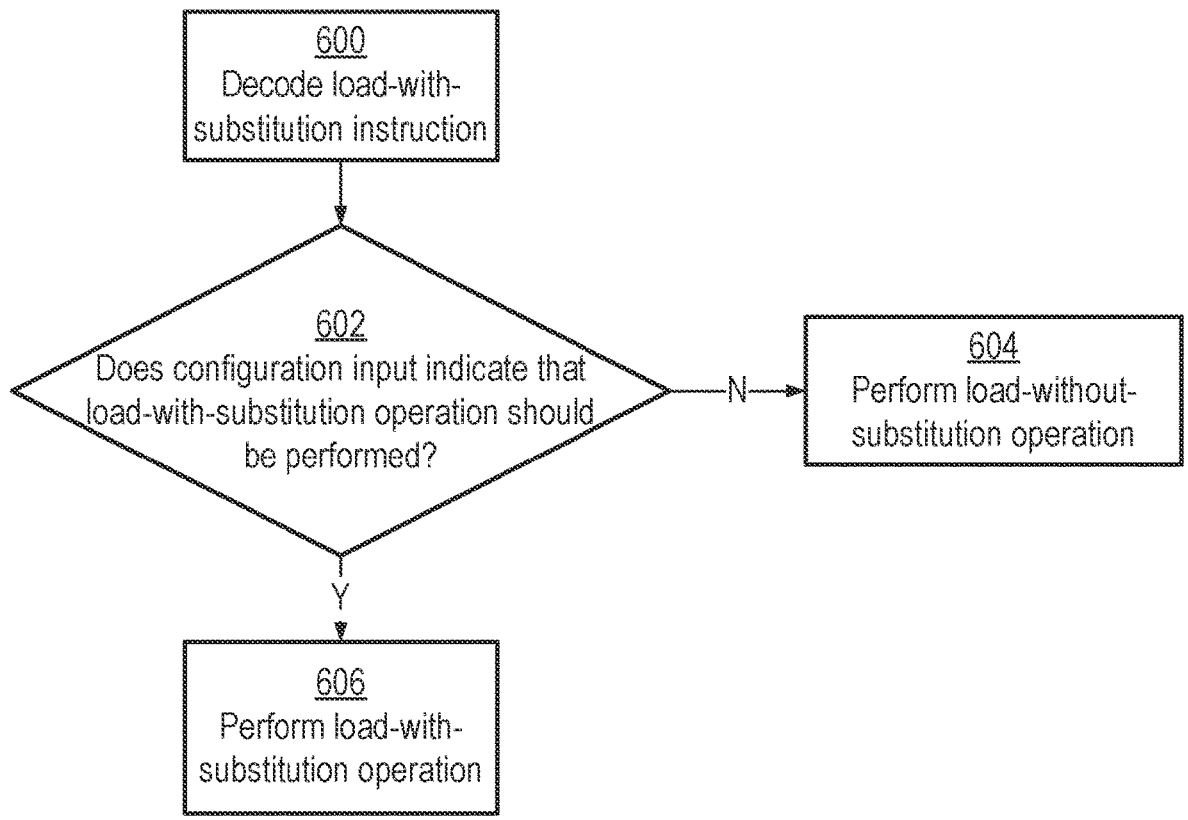

FIG. 6 illustrates a method carried out by a data processing apparatus. At step 600, an instruction decoder 10 decodes a load-with-substitution instruction. At step 602, a configuration input is checked. The configuration input may comprise information provided to the processing circuitry from an external source such as memory or a network, information provided by hint instructions earlier in the same workload as the load-with-substitution instruction, and/or information gathered at runtime based on observations of the execution of instructions (for example, performance monitoring data). The configuration input is checked to determine whether it indicates that the load-with-substitution instruction should trigger a load-with-substitution operation or a load-without-substitution operation.

If it is determined that the load-with-substitution operation should be performed, then this is performed at step 606 as described with reference to steps 502-510 of FIG. 5.

If it is determined that the load-without-substitution operation should be performed, then this is performed at step 604. In the load-without-substitution operation, the processing circuitry issues requests to one or more caches to load target data corresponding to the address specified by the load-with-substitution operation from the one or more caches. If one (or more) of the requests hit in a subset of the caches, then the target data is loaded to the destination register. If the requests miss, then the target data is retrieved from a further level of cache or memory and loaded to the destination register. In both cases, the correct architectural result of the load-without-substitution operation is for the destination register to store the latest value of the target data as obtained from the memory system (not the substitute value).

Figure 7:
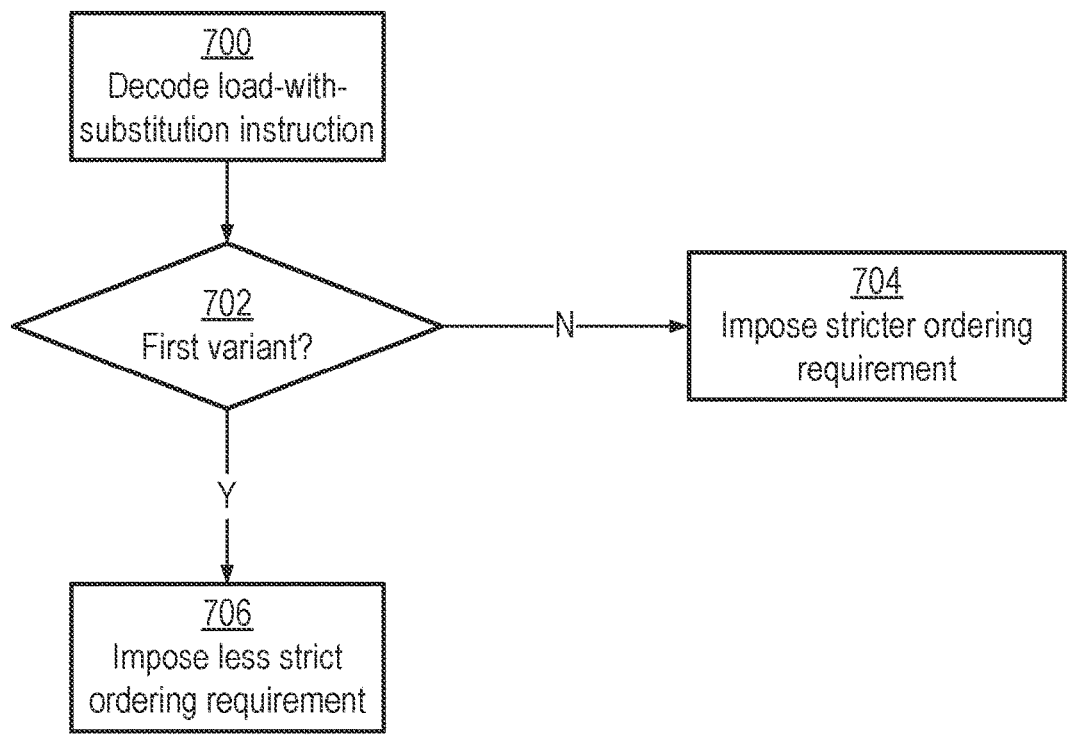

FIG. 7 illustrates a method carried out by a data processing apparatus. At step 700, a load-with-substitute instruction is decoded by the instruction decoder 10. At step 702, it is determined whether the decoded instruction was a first variant or a second variant of the load-with-substitution instruction. In response to determining that the second variant was decoded, at step 704 the processing circuitry 4 imposes an ordering requirement between the load-with-substitution instruction and other load/store operations. The ordering requirement may relate to the order in which the operations are observed to take place relative to each other, for example. For example, the ordering requirement may require that the load is prevented from being bypassed by younger loads in program order (or at least, that the effect of the load with respect to other loads is identical to the outcome that would have occurred if the load had been processed before all younger loads).

In response to determining that the first variant was decoded, at step 706 a less strict ordering requirement is imposed by the processing circuitry. The less strict ordering requirement may allow reordering of instructions to take place that is not permitted by the stricter ordering requirement.

It will be appreciated that, along with steps 702-706, the steps of FIG. 6 and/or FIG. 5 may also be carried out to provide an architectural outcome of the load-with-substitution operation, although these steps are not shown in FIG. 7 which relates instead to the decision over implementing a particular ordering requirement.

Figure 8:
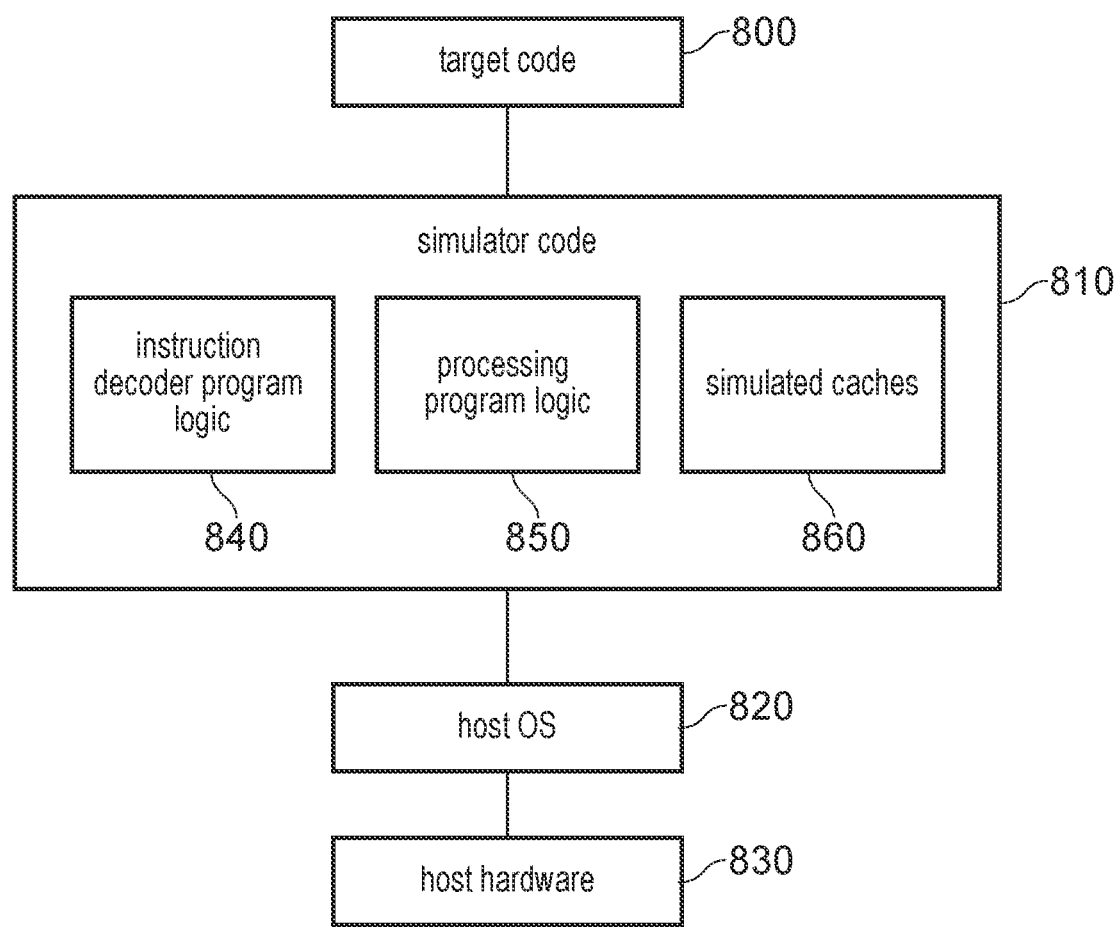
FIG. 8 illustrates a simulator implementation of a data processing apparatus.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 830, optionally running a host operating system 820, supporting the simulator program 810. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 830), some simulated embodiments may make use of the host hardware, where suitable.

The simulator program 810 may be stored on a computer-readable storage medium (which may be a non-transitory medium), and provides a program interface (instruction execution environment) to the target code 800 (which may include applications, operating systems and a hypervisor) which is the same as the interface of the hardware architecture being modelled by the simulator program 810. Thus, the program instructions of the target code 800 may be executed from within the instruction execution environment using the simulator program 810, so that a host computer 830 which does not actually have the hardware features of the apparatus 2 discussed above can emulate these features.

For example, the simulator program 810 may provide instruction decoder program logic 840, processing program logic 850, and simulated caches 860 to simulate the hardware features of the instruction decoder 10, processing circuitry 2, and caches 30, 32, 44 as discussed above.

Concepts described herein may also be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Additionally, examples of the present technique may be configured according to the clauses below.

(1) A data processing apparatus, comprising:
an instruction decoder to decode instructions; and
processing circuitry to perform data processing in response to decoding of the instructions by the instruction decoder, wherein:
the processing circuitry is configured to perform a load-with-substitution operation in response to the instruction decoder decoding a load-with-substitution instruction specifying an address and a destination register, wherein to perform the load-with-substitution operation:
the processing circuitry is configured to issue a request to obtain target data corresponding to the address from one or more caches,
in response to the request hitting in a given cache belonging to a subset of the one or more caches, the processing circuitry is configured to provide, as a correct architectural result corresponding to the destination register of the load-with-substitution instruction, the target data obtained from the given cache; and
in response to the request missing in each cache belonging to the subset of the one or more caches, the processing circuitry is configured to provide a substitute value as the correct architectural result corresponding to the destination register of the load-with-substitution instruction.

(2) The data processing apparatus according to clause 1, wherein
the destination register is an architectural destination register, and
the substitute value comprises a previous data value associated with the architectural destination register prior to the load-with-substitution instruction.

(3) The data processing apparatus according to clause 1, wherein
the substitute value comprises a data value associated with a further register specified by the load-with-substitution instruction.

(4) The data processing apparatus according to any preceding clause, wherein
a location from which the processing circuitry obtains the substitute value is independent of the address specified by the load-with-substitution instruction.

(5) The data processing apparatus according to any preceding clause, wherein
the processing circuitry is configured to, in response to the instruction decoder decoding the load-with-substitution instruction, selectively perform the load-with-substitution operation or a load-without-substitution operation in dependence on a configuration input;
wherein to perform the load-without-substitution operation the processing circuitry is configured to issue the request to obtain target data corresponding to the address from one or more caches and to provide, as the correct architectural result corresponding to the destination register of the load-with-substitution instruction, the target data irrespective of whether the request hits in the subset of the one or more caches.

(6) The data processing apparatus according to any preceding clause, wherein
in response to the request missing in each cache belonging to the subset of the one or more caches, the processing circuitry is configured to perform a speculative linefill operation to retrieve the target data from a further cache or memory and allocate the target data into a cache in the subset of the one or more caches.

(7) The data processing apparatus according to clause 6, wherein
the processing circuitry is configured to, in response to the request missing in each cache belonging to the subset of the one or more caches, selectively perform or suppress the speculative linefill operation in dependence on a linefill configuration input.

(8) The data processing apparatus according to any of clauses 6 to 7, wherein
in response to the request missing in each cache belonging to the subset of the one or more caches, the processing circuitry is configured to allow a subsequent dependent instruction, which is dependent on the destination register of the load-with-substitution instruction, to be executed before the speculative linefill operation has retrieved the target data.

(9) The data processing apparatus according to any preceding clause, wherein
the subset of the one or more caches is a proper subset.

(10) The data processing apparatus according to any preceding clause, wherein
the subset of the one or more caches comprises at least a level one cache associated with the processing circuitry.

(11) The data processing apparatus according to any preceding clause, wherein
in response to the instruction decoder decoding a second variant of the load-with-substitution instruction, the processing circuitry is configured to impose a stricter ordering requirement between the load-with-substitution instruction and other load/store operations than is imposed in response to the instruction decoder decoding a first variant of the load-with-substitution instruction.

(12) A non-transitory computer-readable medium to store computer-readable code for fabrication of the data processing apparatus of clause 1.

(13) A computer-readable storage medium storing a computer program for controlling a host data processing apparatus to provide an instruction execution environment, the computer program comprising:
instruction decoding program logic to decode instructions; and
processing program logic to perform data processing in response to decoding of the instructions by the instruction decoder, wherein:
the processing program logic is configured to perform a load-with-substitution operation in response to the instruction decoding program logic decoding a load-with-substitution instruction specifying an address and a destination register, wherein to perform the load-with-substitution operation:
the processing program logic is configured to issue a request to obtain target data corresponding to the address from one or more simulated caches,
in response to the request hitting in a given simulated cache belonging to a subset of the one or more simulated caches, the processing program logic is configured to provide, as a correct architectural result corresponding to the destination register of the load-with-substitution instruction, the target data obtained from the given simulated cache; and
in response to the request missing in each simulated cache belonging to the subset of the one or more caches, the processing program logic is configured to provide a substitute value as the correct architectural result corresponding to the destination register of the load-with-substitution instruction.

(14) A data processing method, comprising:
in response to decoding of a load-with-substitution instruction specifying an address and a destination register, performing a load-with-substitution operation comprising:
issuing a request to obtain target data corresponding to the address from one or more caches;
in response to the request hitting in a given cache belonging to a subset of the one or more caches, providing, as a correct architectural result corresponding to the destination register of the load-with-substitution instruction, the target data obtained from the given cache; and
in response to the request missing in each cache belonging to the subset of the one or more caches, providing a substitute value as the correct architectural result corresponding to the destination register of the load-with-substitution instruction.

The invention claimed is:
1. A data processing apparatus, comprising:
an instruction decoder to decode instructions; and
processing circuitry to perform data processing in response to decoding of the instructions by the instruction decoder, wherein:

the processing circuitry is configured to perform a load-with-substitution operation in response to the instruction decoder decoding a load-with-substitution instruction specifying an address and a destination register, wherein to perform the load-with-substitution operation:

the processing circuitry is configured to issue a request to obtain target load data corresponding to the address from one or more caches capable of holding load data requested to be loaded in response to a load instruction, in response to the request hitting in a given cache belonging to a subset of the one or more caches, the processing circuitry is configured to provide, as a correct architectural result corresponding to the destination register of the load-with-substitution instruction, the target load data obtained from the given cache; and in response to the request missing in each cache belonging to the subset of the one or more caches, the processing circuitry is configured to provide a substitute value as the correct architectural result corresponding to the destination register of the load-with-substitution instruction, wherein when the target load data and substitute value differ, the processing circuitry is configured to select the correct architectural result of the load-with-substitution instruction in dependence on whether or not the request hit in the subset of the one or more caches.

2. The data processing apparatus according to claim 1, wherein
the destination register is an architectural destination register, and
the substitute value comprises a previous data value associated with the architectural destination register prior to the load-with-substitution instruction.

3. The data processing apparatus according to claim 1, wherein
the substitute value comprises a data value associated with a further register specified by the load-with-substitution instruction.

4. The data processing apparatus according to claim 1, wherein
a location from which the processing circuitry obtains the substitute value is independent of the address specified by the load-with-substitution instruction.

5. The data processing apparatus according to claim 1, wherein
the processing circuitry is configured to, in response to the instruction decoder decoding the load-with-substitution instruction, selectively perform the load-with-substitution operation or a load-without-substitution operation in dependence on a configuration input;
wherein to perform the load-without-substitution operation the processing circuitry is configured to issue the request to obtain the target load data corresponding to the address from one or more caches and to provide, as the correct architectural result corresponding to the destination register of the load-with-substitution instruction, the target load data irrespective of whether the request hits in the subset of the one or more caches.

6. The data processing apparatus according to claim 1, wherein
in response to the request missing in each cache belonging to the subset of the one or more caches, the processing circuitry is configured to perform a speculative linefill operation to retrieve the target load data from a further cache or memory and allocate the target load data into a cache in the subset of the one or more caches.

7. The data processing apparatus according to claim 6, wherein
the processing circuitry is configured to, in response to the request missing in each cache belonging to the subset of the one or more caches, selectively perform or suppress the speculative linefill operation in dependence on a linefill configuration input.

8. The data processing apparatus according to claim 6, wherein
in response to the request missing in each cache belonging to the subset of the one or more caches, the processing circuitry is configured to allow a subsequent dependent instruction, which is dependent on the destination register of the load-with-substitution instruction, to be executed before the speculative linefill operation has retrieved the target load data.

9. The data processing apparatus according to claim 1, wherein
the subset of the one or more caches is a proper subset.

10. The data processing apparatus according to claim 1, wherein
the subset of the one or more caches comprises at least a level one cache associated with the processing circuitry.

11. The data processing apparatus according to claim 1, wherein
in response to the instruction decoder decoding a second variant of the load-with-substitution instruction, the processing circuitry is configured to impose a stricter ordering requirement between the load-with-substitution instruction and other load/store operations than is imposed in response to the instruction decoder decoding a first variant of the load-with-substitution instruction.

12. A non-transitory computer-readable medium to store computer-readable code for fabrication of the data processing apparatus of claim 1.

13. A non-transitory computer-readable storage medium storing a computer program for controlling a host data processing apparatus to provide an instruction execution environment, the computer program comprising:
instruction decoding program logic to decode instructions; and
processing program logic to perform data processing in response to decoding of the instructions by the instruction decoder, wherein:
the processing program logic is configured to perform a load-with-substitution operation in response to the instruction decoding program logic decoding a load-with-substitution instruction specifying an address and a destination register, wherein to perform the load-with-substitution operation:
the processing program logic is configured to issue a request to obtain target load data corresponding to the address from one or more simulated caches capable of holding load data requested to be loaded in response to a load instruction,
in response to the request hitting in a given simulated cache belonging to a subset of the one or more simulated caches, the processing program logic is configured to provide, as a correct architectural result corresponding to the destination register of the load-with-substitution instruction, the target load data obtained from the given simulated cache; and
in response to the request missing in each simulated cache belonging to the subset of the one or more simulated caches, the processing program logic is configured to provide a substitute value as the correct architectural result corresponding to the destination register of the load-with-substitution instruction, wherein when the target load data and substitute value differ, the processing program logic is configured to select the correct architectural result of the load-with-substitution instruction in dependence on whether or not the request hit in the subset of the one or more simulated caches.

14. A data processing method, comprising:

in response to decoding of a load-with-substitution instruction specifying an address and a destination register, performing a load-with-substitution operation comprising:

issuing a request to obtain target load data corresponding to the address from one or more caches;

in response to the request hitting in a given cache belonging to a subset of the one or more caches, providing, as a correct architectural result corresponding to the destination register of the load-with-substitution instruction, the target load data obtained from the given cache; and in response to the request missing in each cache belonging to the subset of the one or more caches, providing a substitute value as the correct architectural result corresponding to the destination register of the load-with-substitution instruction, and when the target load data and substitute value differ, selecting the correct architectural result of the load-with-substitution instruction in dependence on whether or not the request hit in the subset of the one or more caches.

* * * * *